Figure 8:
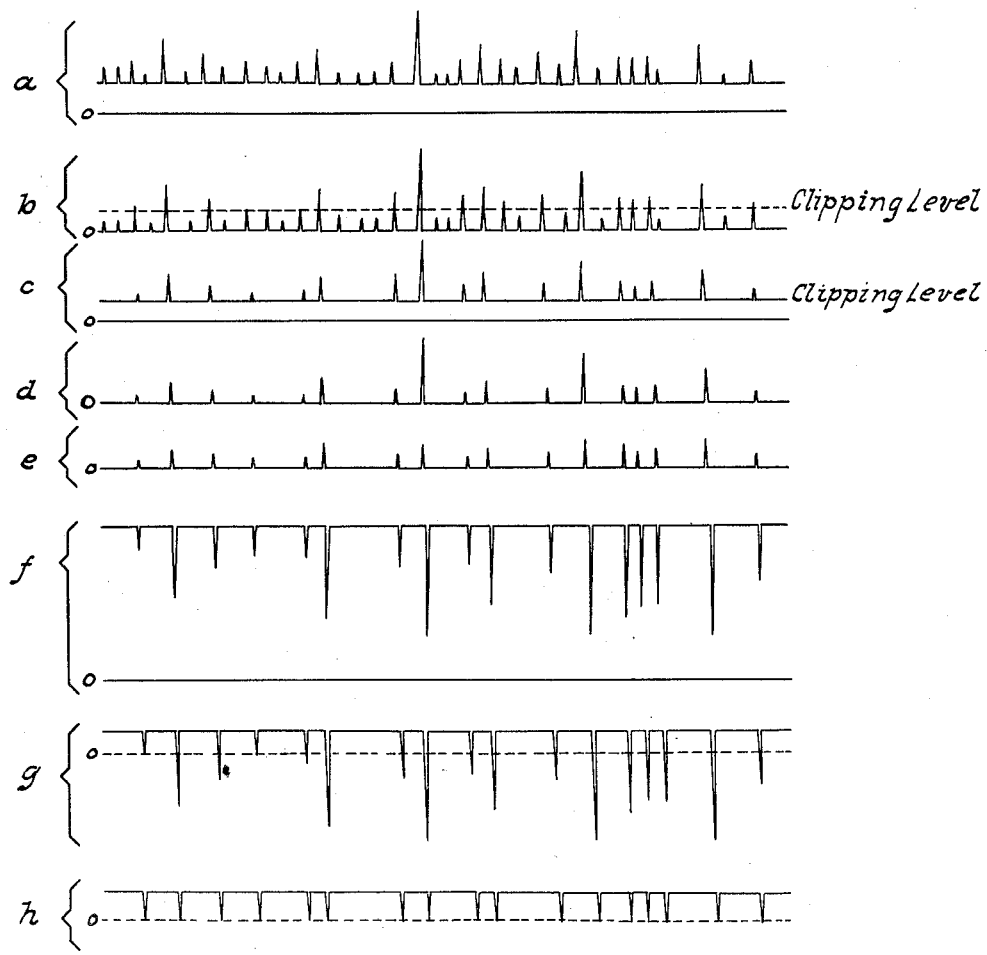

July 12, 1960
S. N. STEVENS
2,944,667
ELECTRONIC INSPECTION APPARATUS
Filed Oct. 8, 1951
6 Sheets-Sheet 1
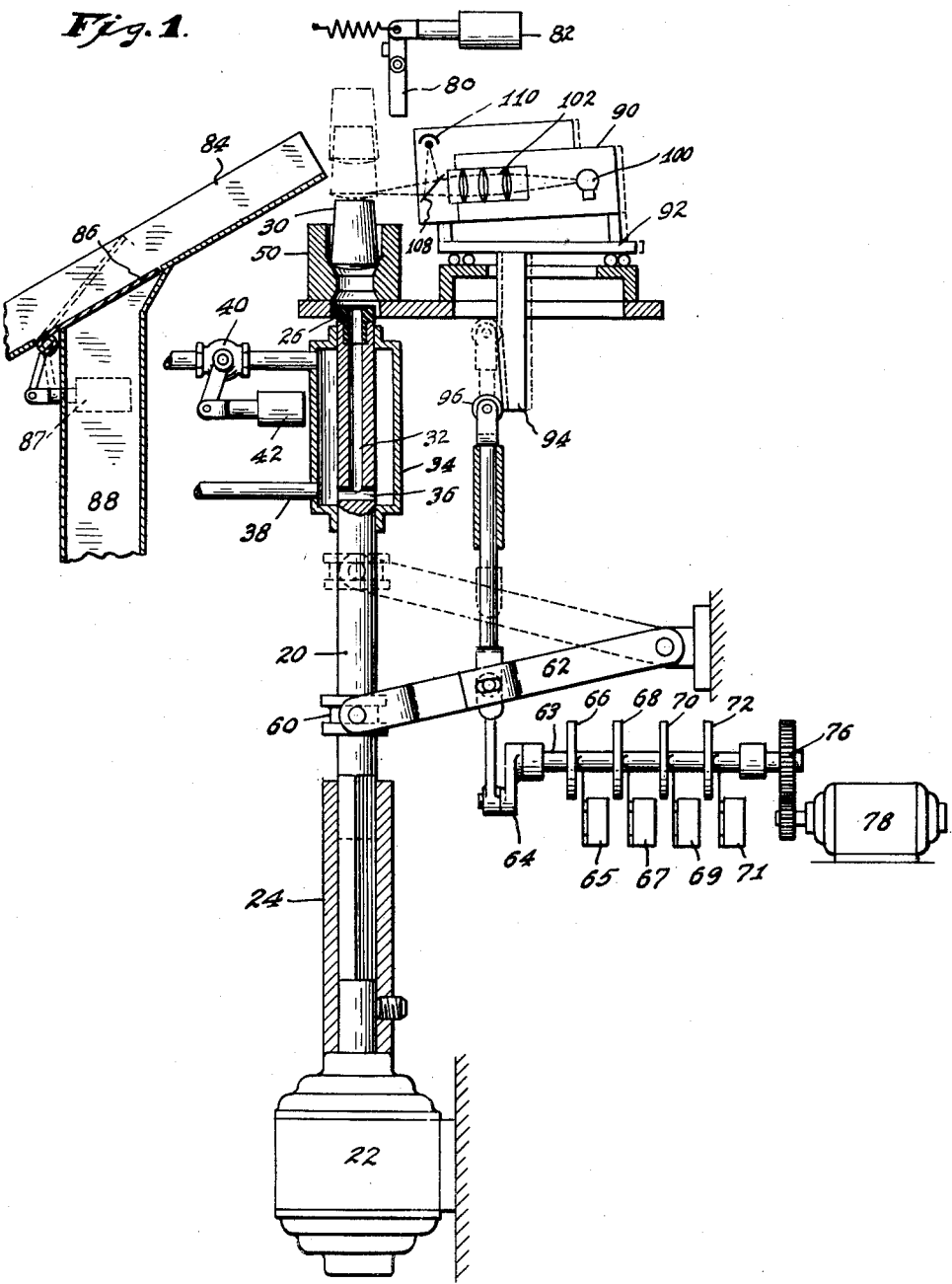
INVENTOR.
SAMUEL N. STEVENS,
BY
Schley, Zach & Jenkins
ATTORNEYS.

July 12, 1960  S. N. STEVENS  2,944,667
ELECTRONIC INSPECTION APPARATUS
Filed Oct. 8, 1951  6 Sheets-Sheet 2
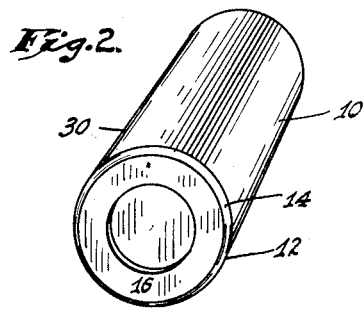
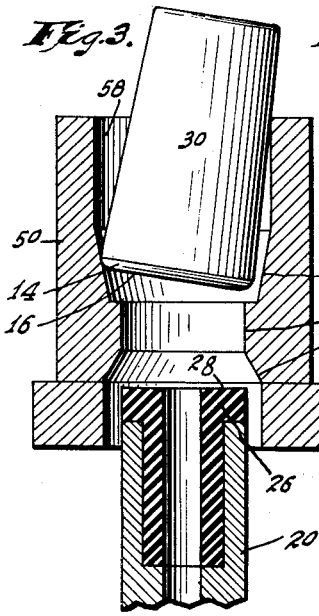
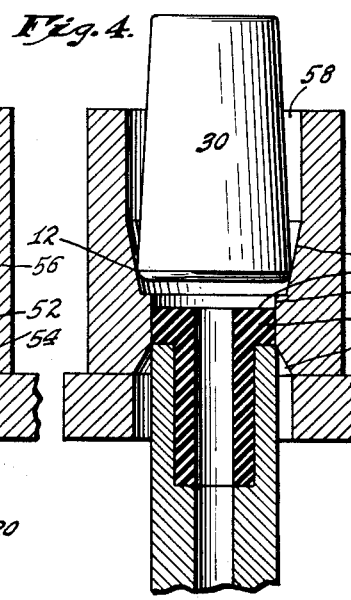
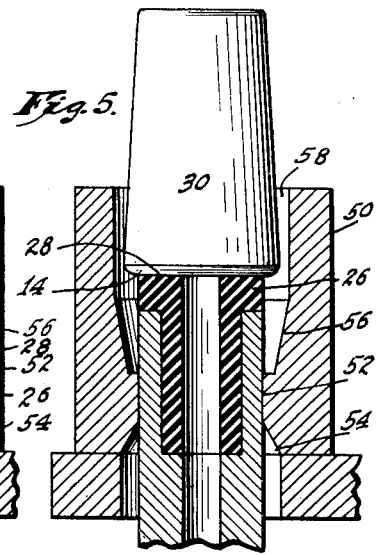
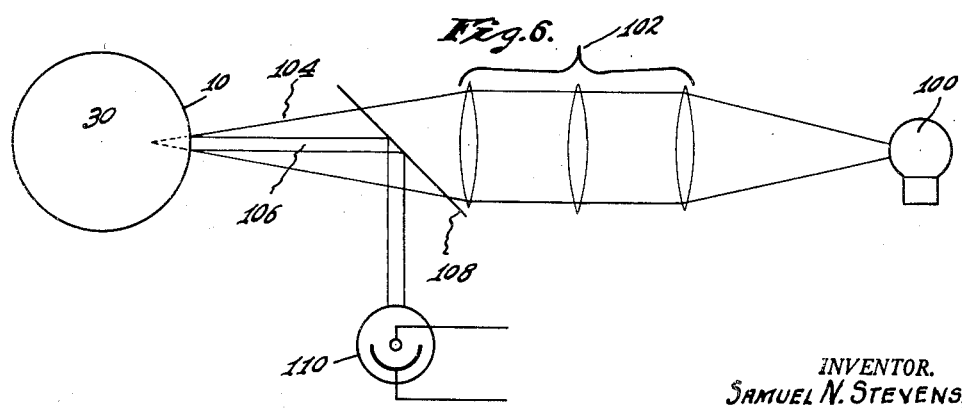
INVENTOR.
SAMUEL N. STEVENS,
BY
ATTORNEYS.

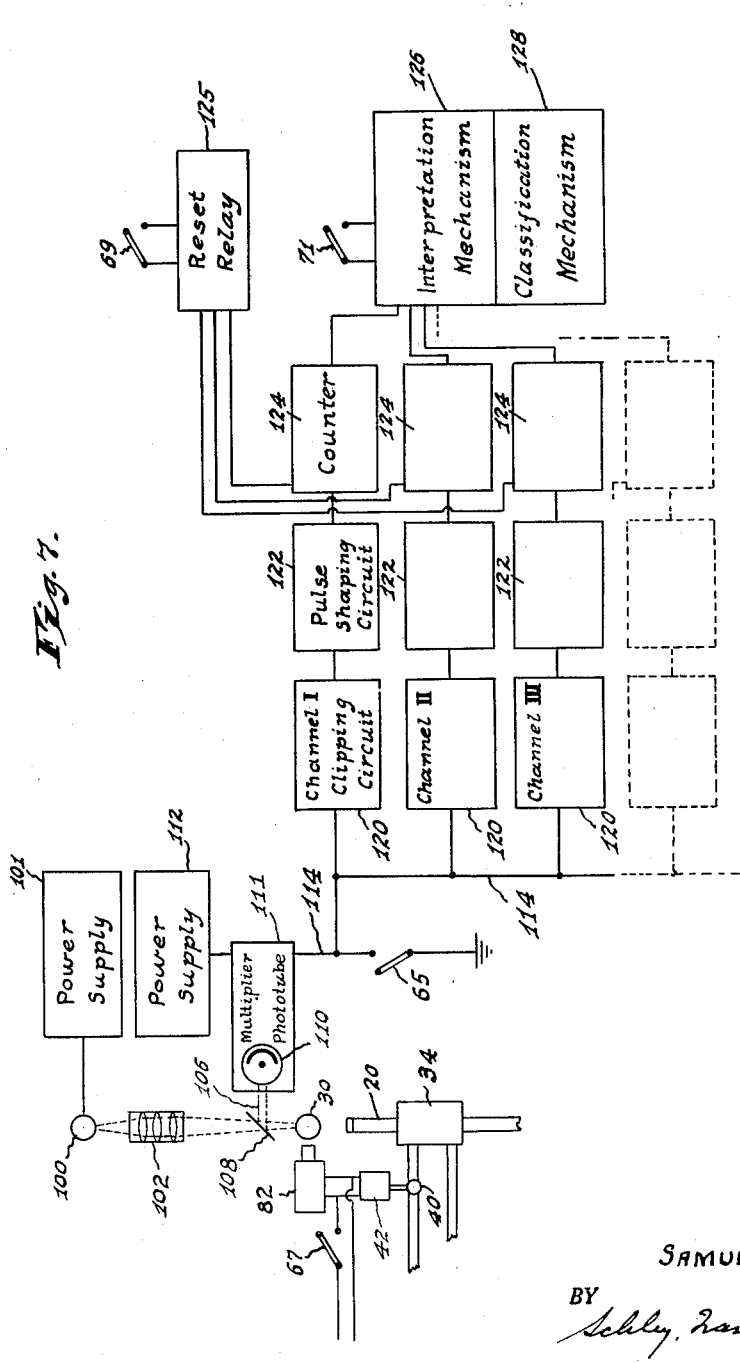

July 12, 1960  S. N. STEVENS  2,944,667
ELECTRONIC INSPECTION APPARATUS
Filed Oct. 8, 1951  6 Sheets-Sheet 4

INVENTOR.
SAMUEL N. STEVENS,
BY
ATTORNEYS.

July 12, 1960 S. N. STEVENS 2,944,667
ELECTRONIC INSPECTION APPARATUS
Filed Oct. 8, 1951 6 Sheets-Sheet 5
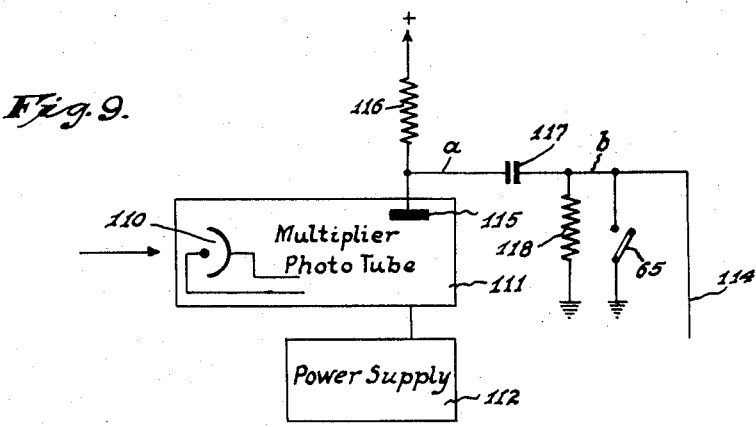
Fig. 9.
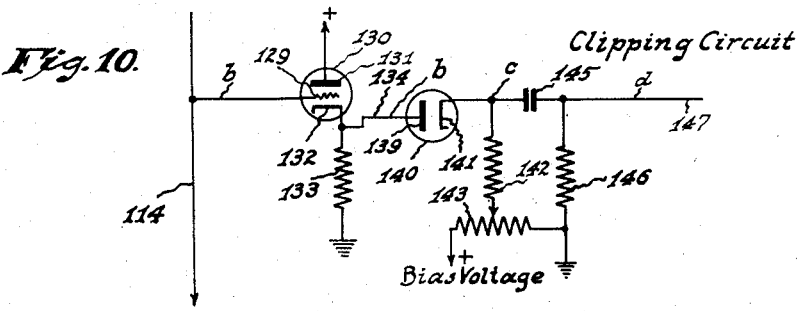
Fig. 10.
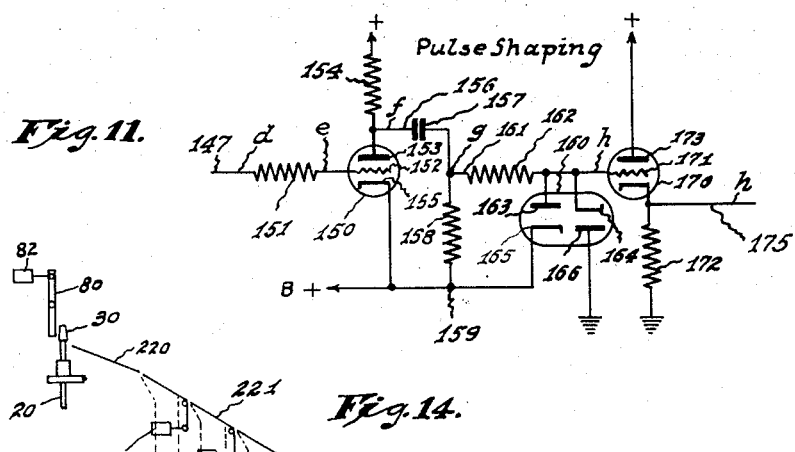
Fig. 11.
Fig. 14.
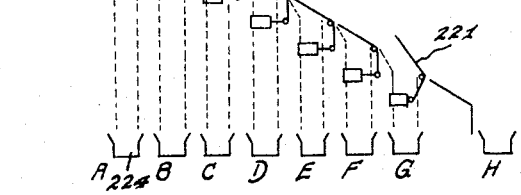
INVENTOR.
SAMUEL N. STEVENS,
BY
ATTORNEYS.

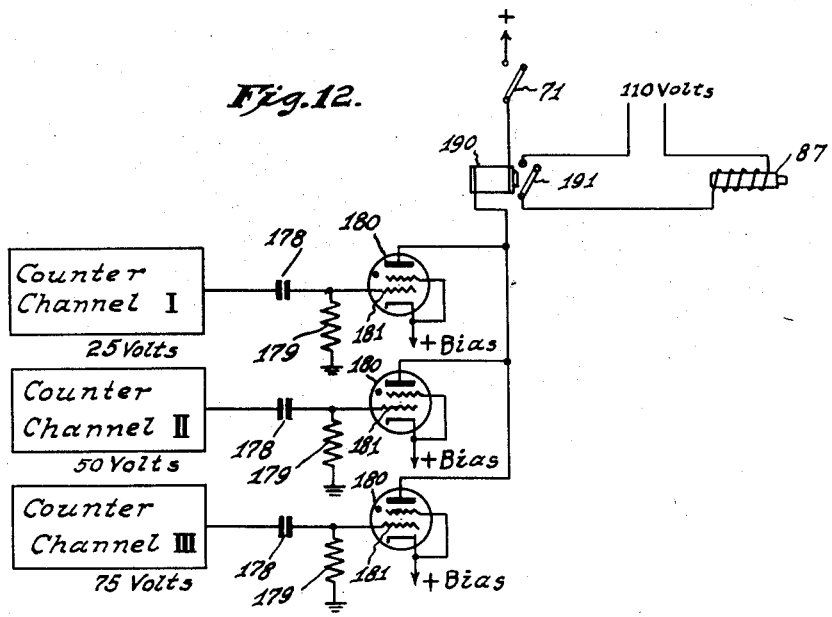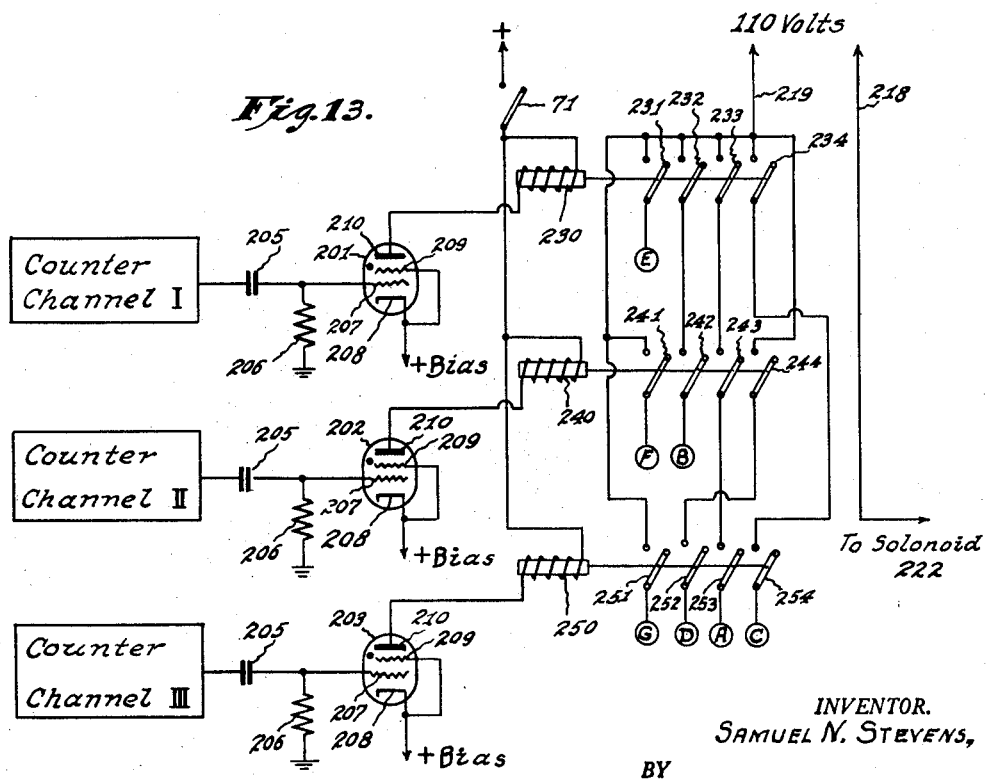

United States Patent Office 2,944,667
Patented July 12, 1960

2,944,667

ELECTRONIC INSPECTION APPARATUS

Samuel N. Stevens, West Lafayette, Ind., assignor to The Timken Roller Bearing Company, Canton, Ohio, a corporation of Ohio Filed Oct. 8, 1951, Ser. No. 250,338

14 Claims. (Cl. 209—111)

This invention relates to methods and apparatus for interpreting voltage waveforms, and to inspection methods and apparatus employing such interpretation. The methods and apparatus are especially suitable for surface inspection, as for the inspection of ground or honed bearing surfaces, but their use is not limited to inspection of bearing surfaces, nor even to surface inspection.

It is an object of the invention to generate a voltage waveform which is representative of variations of an inspection characteristic—a characteristic of the inspected work, and which contains variations corresponding both in number and magnitude to variations of the inspection characteristic. The inspection from which the waveform is generated may be either an entire inspection or a partial inspection of each piece, and may be applied either to all pieces or to samples, as may be desired in accordance with the purpose and the statistical requirements of the inspection operation.

It is an object of the invention to interpret a voltage waveform, such as that representative of variations of an inspection characteristic, to derive data at a plurality of selected levels corresponding to selected magnitudes or types of variations represented by the waveform, and to obtain inspection or classification data with respect to such selected magnitudes or types of variations. It is thus an object of the invention to obtain classification data not only with respect to large abnormalities of the work but also or alternatively with respect to variations at selected lower levels, for example variations in the quality of normal work pieces.

It is an object of the invention to generate a voltage wave which varies with inspection characteristics over the whole inspected portion of the work, and to interpret such wave to obtain classification indicia or effect classification based on the total variations of inspection characteristics (at one or more selected levels) over the whole inspected portion of the inspected piece.

It is an object of the invention, by this means, to obtain data representative of normal or permissible variations in inspection characteristics, and to classify the work from various aspects of variations within, or departure from, such normal or standard condition. It is an object of the invention to provide means not only for classification on an accept-reject basis, but also for classification of either or both the accepted and rejected work according to statistical or other established standards.

It is an object of the invention to effect inspection with an optical system, which may employ either light reflection or light transmission, and to generate the desired electrical wave in response to light variations.

It is an object of the invention to provide inspection means which effectively operates rapidly, and thus to provide for a running inspection as an integral part of a high-speed production cycle.

It is especially an object of the invention to effect an improved and highly accurate inspection of surface conditions, for example degrees of roughness or smoothness of surface finishes, chatter marks, wheel marks, cracks, nicks, scratches, bits, corrosion, irregularities such as flats and eccentricities of curved or generated surfaces, etc.

The inspection and interpretation method and apparatus is especially suitable for the inspection of generated bearing surfaces, and I have chosen to illustrate it in connection with the inspection of such bearing surfaces.

In accordance with the invention, the work to be inspected is presented to a scanning head and is scanned by relative movement of a small scanning spot in a predetermined pattern over the portion to be inspected. The response to the scanning operation acts on suitable electrical mechanism to generate a voltage wave containing voltage variations corresponding to variations of the inspection characteristic of the work. The scanning may be done optically, and in accordance with my present disclosure, I prefer to use a controlled beam of light, although I may use general illumination and interpose between the work and the wave-generating mechanism a controlling optical system to delineate the scanning spot.

The inspection response at the scanning spot is taken by suitable electrical means in which a varying voltage wave is generated. With optical inspection, the wave may be generated in a suitable photo tube.

Having once generated the voltage wave corresponding to the varying inspection characteristics, the electrical signal is suitably amplified and stabilized, and is then fed to one or more of a plurality of separation channels. In these several channels the amplified original waveform is separated into a plurality of waveforms representative of work variations at different levels or of different types. A wave containing varying voltage pulses, may be clipped at different voltage levels in these channels, to give a separate voltage wave in each channel containing voltage variations exceeding the clipping level of its channel and representative of work variations at corresponding levels. Thus, the wave resulting from clipping at a high voltage level would contain only those pulses corresponding to major variations in the inspected work, whereas the voltage wave resulting from clipping at a lower voltage level would contatin all voltage pulses corresponding to work variations exceeding a lower level—a more sensitive inspection level.

In each channel, the separated wave is desirably modified, as in a pulse shaping circuit, to bring the several different pulses in the wave to a standard or uniform configuration, to facilitate subsequent counting.

The shaped wave in each channel is then fed to a counting circuit in which the number of pulses is counted. The counts so obtained at various voltage levels, representative of work variations at corresponding inspection levels, may be directly indicated as a measure of quality and may be tabulated by an operator. The work may then be manually classified in accordance therewith. Preferably, however, the counts obtained in the several separation channels are fed to data interpretation circuits. These may actuate suitable signals to indicate directly the classes in which the work is to be classified, and the work may be manually classified accordingly. Desirably, however, especially in quantity production inspection, the data interpretation circuits are used to actuate classifying mechanism. However the classification is done, whether manually or automatically, the work may be classified in accordance with counts at any one or more inspection levels, or in accordance with relationships between counts at a plurality of levels.

The interpretation and classification circuits and mechanism are desirably interlocked with the work-handling apparatus so that they effectively control the classification of successive workpieces and are cleared for the reception and inspection of subsequently pieces.

As pointed out above, scanning may be done by relative movement of a scanning spot over the desired portion of the work, to obtain an integrated inspection response from a continuous train of instantaneous inspection responses. The scanning spot may be delineated by optical mechanism in a scanning head, and any desired pattern of movement may be used, to cover more or less of the work as desired, and the relative movement may be obtained by movement of either the work or the head or both.

For scanning generated surfaces of a bearing part, the part is preferably received by a chuck and spun about the axis of its surface of generation, with that surface in the focus of the scanning spot. Simultaneously, the spinning part and the head may be relatively moved axially of the spinning part, and if the part is tapered, the movement may also include a lateral component to keep the inspection spot in focus on the inspection surface. The resultant relative movement of the scanning spot is a spiral threading the surface of generation of the part. With these arrangements, it is convenient to inspect the entire area of the bearing surface, for the rate of translation may be made to give a spiral spot path of such small pitch that adjacent passes of the inspection spot are either contiguous or overlapping. Alternatively, the pitch of that spiral path may be made greater, and the successive passes of the inspection spot spaced from each other, to effect a partial inspection in which only that part of the surface is inspected which lies on the long-pitch spiral path of the inspection spot. Partial inspection in other patterns may also be obtained, for example, the inspection apparatus may be arranged to inspect only a band portion of the surface, or the piece may be inspected without spinning so that the inspection is confined to a longitudinal strip. With production bearing parts, however, I prefer to make a total and entire inspection. The inspection speed and accuracy which my invention makes possible greatly facilitates such total and entire inspection, and permits it to be done as part of, and in synchronism with, the production cycle, and at as many points in that cycle as may be desired.

The scanning step of my invention is illustrated in connection with work-handling and inspection head mechanism especially adapted for the inspection of surfaces of generation, particularly tapered bearing rollers, which mechanism is the subject of my co-pending application Serial No. 298,689, filed July 14, 1952, now Patent 2,738,197.

The accompanying drawings illustrate my invention: In such drawings, Fig. 1 is a somewhat diagrammatic front elevation of mechanism for the inspection of tapered bearing rollers; Fig. 2 is an isometric view of a bearing roller; Figs. 3, 4, and 5 are vertical sections on the axis of the roller-supporting spindle of Fig. 1, showing successive positions of a bearing roller in the progressive action by which it is chucked on the spindle; Fig. 6 is an optical diagram showing a preferred optical system for the inspection of bearing rollers and other convex surfaces of generation; Fig. 7 is a diagram of electrical mechanism for generating, modifying, and interpreting an electrical wave form, such as that representative of variations in the surface characteristics of a bearing roller inspected in the mechanism of Fig. 1; Fig. 8 shows a series of idealized waveforms at successive stages in the electrical mechanism of Fig. 7; Fig. 9 is a diagram of a photo tube circuit suitable for use in the wave-generating mechanism of Fig. 7; Fig. 10 is a diagram of a clipping circuit for use in the mechanism of Fig. 7; Fig. 11 is a diagram of a pulse-shaping circuit for use in the mechanism of Fig. 7; Fig. 12 is an electro-mechanical diagram of interpretation mechanism for operating reject mechanism in response to an actuating signal in any one of three separation channels; Fig. 13 is an electro-mechanical diagram of other interpretation mechanism adapted to operate the classification mechanism of Fig. 14 to classify inspected pieces in accordance with their quality or with the character of their defects; and Fig. 14 is a diagram of classification mechanism for operation thereby.

The mechanism shown in Fig. 1 is adapted to inspect tapered bearing rollers 30 such as shown in Fig. 2. Such rollers 30 have a frusto-conical bearing surface 10 which is finished, and it is this finished surface which is inspected in the mechanism of Fig. 1. The lower edge of the conical surface 10 forms a corner 12 with a curved surface 14. While this curved surface 14 is usually a cast surface, it is quite accurate in an acceptable roller, and I desirably use the corner 12 as a locating reference. The lower or large end of the roller 30 has a finished annular end face 16 of conical or spherical configuration, and I use this finished end face to support the roller 30 during the inspection operation.

Mechanical handling mechanism

The mechanism shown in Fig. 1 comprises a main spindle 20 driven by a motor 22 through a telescoping coupling 24. Its upper end is provided with a seat 28 for the end face 16 of the roller, to receive and support the roller 30. The seat 28 may be formed on an insert or chuck 26 made of stiff rubber or similar material which makes good frictional engagement with steel. The upper end of the spindle 20 is drilled to form a central passage 32, and the spindle extends through a vacuum chamber 34 with which the drilled passage 32 communicates through a cross hole 36. The vacuum chamber 34 is connected to a suitable vacuum pump by a pipe 38, and is desirably also provided with means to break the vacuum. As shown, it is connected to a normally-closed vacuum-breaking valve 40 operated by a solenoid 42 and adapted to admit air to the vacuum chamber 34.

Above and coaxial with the spindle 20 there is a roller locator 50, shown in enlarged section in Fig. 3. It may have a flared inlet throat 54 at the bottom, and has an intermediate section 52 adapted to receive the spindle 20 with a close running fit. Above the intermediate section 52, the locator 50 has a conical locating seat 56, and above this, a cylindrical portion 58 adapted to support the roller 30 in a generally upright position on the locating seat 56.

The spindle 20 is arranged to be reciprocated vertically. Its lowermost position is shown (in full lines) in Fig. 1, where its seat 28 lies below the locator 50. To effect reciprocation, the spindle 20 is rotatably carried by a collar 60 connected to an actuating lever 62 which is linked to a crank 64 on a shaft 63 driven by a motor 78 through a speed-reducing gear set 76. The uppermost position of the spindle is indicated by the dotted-line showing of the lever 62 and by the upper dotted-line showing of the roller. The shaft 63 desirably carries suitable timing and control cams, here shown as four timing cams 66, 68, 70, and 72 which respectively actuate a head control switch 65, an ejection control switch 67, and counter reset switch 69, and an interpretation reset switch 71.

Ejection mechanism may be provided to eject an inspected roller from the spindle 20. As here shown, ejection occurs at the upper end of the stroke of the spindle 20, and is effected by joint operation of the vacuum breaking valve 40 and an ejection lever 80 spring pressed to the retracted position shown and actuated through a pivotal ejection stroke by a solenoid 82. A chute 84 is positioned to receive the ejected roller. A normally closed door 86 in the floor of the chute 84 may be opened by a solenoid 87 to divert defective rollers into a branch chute 88, and when closed, passes acceptable rollers and allows them to proceed down the chute 84.

The optical inspection head 90 shown in Fig. 1 projects a converging beam of light to form an inspection spot on the spinning roller 30 during its rise from the position shown in full lines in Fig. 1 to the middle position shown in dotted lines in Fig. 1. Since the roller is a tapered roller, the head 90 is simultaneously moved to maintain a fixed distance between the head and the tapered surface 10 of the roller. To this end, the head 90 is mounted on a carriage 92 movable radially of the roller 30. Movement of the head is effected by a cam 94 carried by the carriage 92 and actuated by a cam follower 96 connected to the actuating lever 62 for reciprocation with the spindle 20. The slope of the cam 94 is made sufficient to maintain the head 90 at a fixed distance from the moving inspection roller 30, and hence to maintain the focus of the inspection spot thereon.

*Operation of mechanical handling mechanism*

In Fig. 1, it is assumed that rollers 30 are suitably fed to the locator 50, either manually or by mechanical feeding apparatus. The roller 30 to be inspected is dropped into the locator 50 with its big end down. The upper walls 58 of the locator hold the roller 30 in a generally upright position, with its lower end resting on the locator seat 56, as shown in Fig. 3. The spindle 20 lies in a lowered position, with its upper end below the close fitting portion 52 of the locator so that vacuum is not applied to the locator. As the spindle 20 rises, its upper end enters the close fitting portion 52, which connects the locator 50 to the vacuum chamber 34 through the drilled passage 32 of the chuck 26 and cuts off all other air inlet to the vacuum chamber. As this occurs, the inflowing air passing downwardly through the locator 50 around the roller 30 and across the locator seat 56 tends to straighten that roller 30 and to center it in the locator 50, with its lower corner 12 in locating engagement with the locator seat 56, as shown in Fig. 4. As the spindle continues to rise, its seat 28 will engage the annular end face 16 of the roller 30, and the two will form a seal which cuts off air flow into the central passage 32 of the spindle, and the vacuum will firmly hold the roller 30 on the spindle seat 28, with the roller centered thereon, as shown in Fig. 5.

As the roller 30 is raised by the spinning spindle 20, it will spin with that spindle 20 and its upper end will rise to a point where the light beam from the inspection head 90 will form the desired scanning spot on its moving surface 10. At this point the inspection mechanism will be energized by the switch 65.

As the tapered roller 30 rises during the ensuing inspection operation, the cam follower 96 will be carried along the cam 94 to progressively retract the inspection head 90 and keep the light beam in proper focus on the tapered surface 10 of the roller 30.

The relative movement between the rising spinning roller and the inspection head 90 will cause the scanning spot to thread its way downward along the finished surface 10 of the roller 30 in a helical path, with the successive passes of the scanning spot contiguous or overlapping. The whole finished surface 10 of the roller 30 will thus be scanned.

As the rising spindle carries the spinning roller 30 to a point where the scanning spot leaves the finished surface 10, as to the dotted line middle position of the roller shown in Fig. 1, the inspection head 90 will be de-energized by the switch 65. Meanwhile, if the roller 30 being inspected is defective, the inspection interpretation system will have actuated the solenoid 87 to open the door 86. As the roller 30 is carried to its uppermost position, as shown by the upper dotted-line position in Fig. 1, the ejection solenoid 82 and the vent-valve solenoid 42 will be actuated in synchronism by the switch 67, to release the roller 30 from the chuck 26 and eject it into the chute 84. It will slide down the main chute 84 if it is accepted, or will be diverted into the branch chute 88 if it is rejected.

Upon completion of an inspection cycle as set forth above, the spindle 20 will be returned downward to the position shown in Fig. 1, and the electrical mechanism will be reset by the switches 67, 69, and 71 for a subsequent inspection cycle.

*Optics*

The scanning spot which moves over the surface of the roller in the operation described above illuminates successive small portions of the roller and the reflection from those portions is used to generate the desired voltage waveform representative of surface chracteristics. Delineation of the spot may be done either in the incident light or in the reflected light, or both. That is, the piece may be put under general illumination, and a lens system may be used to pick up the reflected light from the inspection spot only; or, alternatively and as shown in the drawings, a lens system may be used to focus a beam of light onto the scanning spot only, so that all significant reflected light comes from that spot only.

The optical system shown in Figs. 1 and 6 includes a light source 100 of stable and constant intensity, and a suitable lens system 102 which focuses a converging light beam 104 through a half-silvered mirror toward the roller 30. The light beam illuminates only a small area on the roller surface 10, and that small illuminated area is the "scanning spot." Light reflected therefrom travels in a path or beam 106 to the half-silvered mirror 108 and is reflected thereby to a phototube element 110, and the light reaching that phototube element generates the voltage waveform.

With this optical system, a perfect surface 10 will reflect the maximum amount of light to the phototube 110. Any deviation from a perfect surface will scatter some of the light and reduce the amount of light reaching the phototube element 110. This in turn will reduce the phototube current and will produce in the voltage signal generated by the phototube circuit voltage variations corresponding to the surface variations of the inspected roller.

*Inpection and interpretation system*

The diagram of Fig. 7 shows the inspection and interpretation system in its relationship to certain of the mechanism described above. Thus, the light source 100, supplied from a suitable power supply 101, throws light through the lens system 102 and the half-silvered mirror 108 onto the inspection piece 30, and the reflected beam 106 is reflected from the inspection piece 30 back to the mirror 108 and thence to the phototube element 110. As shown in Fig. 7, the ejection solenoid 82 and the vacuum-breaking valve solenoid 42 are connected to a suitable power line through their control switch 67, which is normally open.

The original signal generated by the phototube element 110 in response to the reflected light beam 106 is desirably amplified. To this end I desirably use a multiplier phototube 111, of known construction, containing the element 110. This is provided with a suitable power-supply 112, and its output line 114 is connected to the head-control switch 65, by which the inspection head 90 may be deactivated by grounding its output.

The output line 114 from the phototube 111 also leads to a plurality of parallel separation channels, here shown as channels I, II, and III. Each channel includes a clipping circuit 120, and a counting circuit 124, and preferably also includes a pulse-shaping circuit 122 ahead of the counting circuit, to amplify the clipped signal and desirably also to shape the pulses thereof to a more or less uniform amplitude to facilitate counting. Any number of such parallel channels may be employed, more or less than the three channels shown by way of example in Fig. 7.

The counting circuits 124 are all provided with reset mechanisms actuated together by a counter-reset relay 125 controlled by the cam-operated switch 69.

The output from the several clipping, shaping, and counting circuit channels is fed to interpretation mechanism 126, arranged to be reset by the cam-operated switch 71. This mechanism 126, in turn, controls classification control mechanism 128. This may be simply accept-reject mechanism, such as that shown in Fig. 12, or may be mechanism which effects classification in a larger number of classes. For example, with three separation channels, the inspected pieces may be classified in as many as eight classes, as shown in Figs. 13 and 14.

The phototube, clipping, and pulse-shaping circuits shown in Figs. 9 to 11 provide the preferred and desired functions.

Phototube circuit

The phototube circuit shown in Fig. 9 includes the multiplier phototube 111 containing the light-sensitive element 110, and the power supply 112. The plate 115 of the multiplier phototube is connected to a suitable plate load, here shown as a resistor 116 connected to a positive voltage source. The plate 115 is also connected to the output lead 114 through a coupling circuit comprising a capacitor 117 and a grounded resistor 118. The inspection head-controlling switch 65 is connected between the output lead 114 and ground.

The varying light reflected from the inspected piece to the phototube element 110 produces a varying current in the phototube circuits, which is amplified by the multiplier phototube. The amplified current flows in the plate circuit through the load resistor 116 and develops a varying voltage across that resistor, in a waveform representative of surface variations of the inspected roller 30. Fig. 8a shows an idealized illustration of a voltage waveform which appears at the lower end of the resistor 116, at the point a in Fig. 9. It has an average D.C. potential represented by the upward spacing of the waveform from the zero line in Fig. 8-a and contains a multiplicity of voltage pulses of varying values greater than the average D.C. voltage, as indicated by the varying heights of the peaks shown. The coupling circuit 117—118 blocks the D.C. potential, but preserves and passes the waveform, which now appears in the output lead 114 as at the point b, with a zero average potential as shown in Fig. 8-b. The output lead 114 feeds the varying voltage represented by waveform b to the clipping circuit in each of the several channels.

Clipping circuit

The clipping circuits in the several channels are the same, and are adjustable to clip the voltage waveform at the same or different selected levels. The lead 114 is desirably coupled to the clipping circuit through a cathode-follower, as is shown in Fig. 10. For this, the lead 114 is connected to the grid 129 of a triode vacuum tube 130 in a cathode follower circuit. The plate 131 of the tube 130 is connected directly to a positive voltage supply, and its cathode 132 is connected through a resistor 133 to ground, and an output lead 134 is connected between the cathode 132 and the resistor 133. The grid circuit of the cathode-follower tube 130 presents a high impedance to the phototube output, which prevents the clipping circuit from exerting any loading effect on the phototube circuit. For present purposes, it may be considered that the waveform undergoes no change in the cathode follower, so that waveform b also appears in the output lead 134, as indicated in Fig. 10.

The output lead 134 from the cathode follower is connected to the plate 139 of a diode vacuum tube 140, whose cathode 141 is connected through a fixed resistor 142 to a variable point on a resistor 143 connected between ground and a positive bias voltage source. By adjustment of the variable connection between the resistor 142 and the resistor 143, the cathode 141 is biased at a selected positive voltage, and the diode 140 will then pass only those portions of the input waveform which exceed that selected positive voltage. Assuming the selected positive voltage to be that represented by the clipping level shown in Figs. 8-b and 8-c, the clipping circuit will pass only those peaks of the voltage waveform which exceed this selected voltage level, and the output voltage waveform, appearing at the point c in Fig. 10, will thus be as shown in Fig. 8-c, and will contain only those pulses which correspond to the upper portions of the peaks of the waveform shown in Fig. 8-b—those portions which exceed the clipping level.

The clipping circuit is connected at the point c to an output lead 147 through a coupling circuit comprising a capacitor 145 and resistor 146. The average D.C. potential of the waveform c, represented by the upward spacing of the waveform in Fig. 8-c above the zero line, will be blocked in the output coupling circuit, and the output voltage waveform therefrom, which appears in the output lead 147, at the point d, will have a zero average potential, as shown in Fig. 8-d.

The clipping circuits in the different channels I, II, and III will normally be adjusted to clip the voltage waveform at different levels, by adjusting the point of connection of the resistor 142 to the resistor 143 to give different selected positive voltage bias values in the respective clipping tubes 140. Thus, channel I may be adjusted to a clipping level of say 25 volts, channel II at say 50 volts, and channel III at say 75 volts. The separated waveform of each channel will contain all voltage pulses exceeding the selected voltage bias. Channel I may be made to contain all pulses representative of surface variations which are significant under the chosen inspection conditions, channel II all voltage pulses representative of intermediate and greater variations of the inspected surface, and channel III only those voltage pulses corresponding to relatively serious defects in the inspected piece.

Pulse shaping circuit

As shown in Fig. 11, the clipping circuit is coupled to the pulse shaping circuit through a pulse-modifying amplifier triode tube 150. The output lead 147, carrying the waveform shown in Fig. 8-d, is connected to the grid 152 of the tube 150 through a resistor 151. The plate 153 of the tube is connected through a resistor 154 to a voltage source at a suitable positive potential. The tube 150 operates as a pulse-limiting amplifier. Its cathode 155 is connected to a positive voltage source to maintain it at a fixed positive potential with respect to the zero potential of the grid. Whenever a voltage pulse in the input waveform (Fig. 8-d) appearing at the input end of the resistor 151 rises above the fixed positive bias of the cathode 155, grid current flows; and the flow of grid current through resistor 151 develops a sufficient voltage drop across that resistor 151 to counteract the pulse voltage which is above the cathode bias potential. As a result, the high peaks of the waveform are reduced, and the waveform appearing at the grid 152, at the point marked e in Fig. 11, is as shown in Fig. 8-e.

With grid potentials less than the fixed bias of the cathode 155, the tube 150 acts as an amplifier to develop a waveform in the output lead 156 of its plate circuit, at the point marked f, in which the wave pulses are amplified and inverted, as shown in Fig. 8-f.

The output at f from the plate-circuit of the amplifier tube 150 is connected to the input lead 161 of a pulse-shaping double diode tube 160 through a coupling circuit comprising a capacitor 157 and a resistor 158. The resistor 158 is connected at 159 to a positive voltage source, conveniently the same as the cathode 155, so that the output voltage waveform from the amplifier tube 150, appearing in the input lead 161 to the pulse shaping tube 160, at the point g in Fig. 10, has an average potential equal to that at the point 159, and appears as in Fig. 8-g.

The lead 161, carrying the wave form shown in Fig. 8-g, is connected through a resistor 162 to one plate 163 and one cathode 164 of the double diode 160, and to the grid 171 of a cathode-follower tube 170. The cathode 165 in circuit with the plate 163 of the tube 160 is connected to the positive voltage source at the point 159, and the plate 166 in circuit with the cathode 164 is connected to ground. The cathode of the cathode follower 170 is connected through a resistor 172 to ground, and the plate 173 of that tube is connected to a positive voltage source.

Whenever the voltage variations in the waveform *g* raise the potential at the input end of resistor 162 above the positive potential at 159, current flows in the diode 163—165, and a compensating voltage drop appears across the resistor 162, such that the voltage at the grid 171 of the cathode follower tube 170 does not go significantly positive with respect to the positive potential at that point 159. The action of the diode 163—165, therefore, limits in a positive sense the pulses of waveform *g* which are transmitted to the cathode follower.

Whenever the voltage variations of the waveform *g* lower the potential at the input end of resistor 162 below ground potential, (i.e. below the zero potential indicated in Fig. 8–*g*), current flows through the circuit containing the diode 164—166 and resistor 162, and a compensating voltage drop appears across that resistor to prevent voltage on the grid 171 from going significantly below ground potential. The action of the diode 164—166, therefore, limits in a negative sense the pulses of waveform *g* which are transmitted to the grid 171 of the cathode follower.

As the result of the limiting actions, only those portions of the pulses of waveform *g* which lie between the fixed positive potential at the point 159 and the zero ground potential are transmitted to the grid 171 of the cathode follower 170; and the waveform appearing at the grid, at the point marked *h*, as is shown in Fig. 8–*h*. The cathode follower 170, for present purposes, can be assumed to make no change in the waveform, so that the waveform appearing at the output lead 175 from the cathode follower is likewise represented by Fig. 8–*h*.

The pulses in waveform *h*, derived from the varying pulses exceeding the clipping level of the clipping circuit, are now all of equal amplitude to facilitate counting.

The counting circuit

Any of various known counting circuits 124 may be employed. The pulses of the output waveform (Fig. 8–*h*) from the pulse-shaping circuit (Fig. 11) of each channel are counted in a suitable counter which transmits a single output pulse or signal when a predetermined input-pulse count is reached. The counter used may be chosen in the light of the number and speed of the pulses produced by the inspection, and should be of sufficient capacity and speed to handle the pulses which it receives from antecedent circuits in its channel. Suitable known high-speed counters include a scale-of-ten electronic counters containing a number of interconnected decade counter units sufficient to make the desired count. As shown in Fig. 7, the counter (124) of each channel is connected to receive the output from the pulse-shaping circuit (122) of the channel, and the counter output pulse, representing completion of the predetermined count for the channel, is transmitted to an observable signal device or preferably to classification control mechanism. As shown in Figs. 12 and 13, the counter output pulse is fed to the control grid of a gas-filled tube or valve which controls a classification circuit, and causes that tube to fire and close its circuit. The appearance of the tube in its fired state provides an observable signal that the predetermined count has been reached in the connected counter.

The input pulses represent individual variations of the inspection characteristics of the inspected piece at the inspection level fixed by the clipping circuit adjustment. If the clipping level is high, the variation-indicating pulses will represent major defects, for example, cracks, or nicks; and rejection is desirable upon the occurrence of a single pulse or but a few pulses representative of such major defects. In such case, the predetermined count of the high clipping level channel should be a low number, and the counter is set to transmit an output pulse when the input pulses received by it reach or exceed that low number. For example, in channel III, set at a clipping level of 75 volts, the counter may be set to transmit one output pulse upon the occurrence of 10 input pulses.

A channel set at an intermediate clipping level will transmit to the counter pulses representative of intermediate variations in inspection characteristics, for example, tool marks, wheel marks, etc. In this case, classification may be made to depend on the occurrence of a relatively large number of such intermediate variations, and the counter of this channel will accordingly be set to transmit an output pulse when the input pulses to it exceed that relatively large number. For example, in channel II, set at a clipping level of 50 volts, the counter may be set to transmit one output pulse upon the occurrence of 200 input pulses.

The channel set at the lowermost clipping level can transmit to its counter all pulses which are significant in the inspection operation, including not only those which are counted at the high clipping levels but also relatively small variations. In this case, the counter will be set to transmit an output pulse when its input pulses exceed a high number. For example, in channel I, set at a clipping level of 25 volts, the counter may be set to transmit one output pulse upon the occurrence of 2000 input pulses.

There will thus be inspection interpretation at a plurality of different levels. The inspection result can be based upon the occurrence of an output pulse in any of the several channels, or upon the related occurrence of output pulses in a plurality of channels. Interpretation data can be obtained at any level and at any number of levels needed for the statistical requirements of the desired inspection operation.

Interpretation circuit (Fig. 12)

The interpretation circuit of Fig. 12 is adapted to operate the single reject door 86 of the chute 84 shown in Fig. 1. As shown, it is connected to three channels, but a greater or less number of channels can be used. It is responsive to inspection conditions at each of the levels represented by the three channels, and is responsive to defect-indicating pulses from any one or more of such channels. It effects rejection only, without classification of the rejected pieces.

The three channels are each connected through a coupling circuit comprising a capacitor 178 and a resistor 179 to the grid 181 of a gas-filled tetrode tube 180. The cathode and screen grid of each of the tetrodes 180 is connected to a positive bias such that the tubes are normally non-conducting. The plates of the tetrodes 180 are connected together and to the coil of a relay 190 which controls a normally open switch 191. The coil forms the common plate load for all of the tubes 180 and is connected to a positive voltage source through the re-set switch 71, which is normally in closed position.

The relay switch 191 controls the supply circuit to the solenoid 87 which opens the reject door 86 of the chute 84 shown in Fig. 1.

In the interpretation mechanism of Fig. 12, a pulse count in any one of the three channels exceeding the predetermined acceptable count for that channel will cause rejection of the inspected piece. When the predetermined acceptable count in a channel is exceeded, the counter transmits a positive pulse to the connected gas-filled tetrode 180, to drive the grid 181 thereof positive with respect to the cathode. The tube then becomes conducting, and remains conducting until its plate circuit is opened by opening the re-set switch 71. When any one of the gas filled tubes 180 becomes conducting, current flows in its plate circuit to actuate the relay 190 and close the switch 191 to energize the reject door solenoid 87. This opens the reject door 86 of the chute 84, and upon ejection of the roller 30 from the chuck 26, that roller passes into the branch chute 88 as a rejected roller.

Upon completion of each inspection, the switch 69 is mechanically actuated to reset the counters, and the switch 71 is opened momentarily to break the circuits in the gas-filled tetrodes and render them non-conducting until again actuated by a counter output pulse, and to open the relay swtich 191 and release the reject door 86 to closed position.

*Interpretation and classifiction mechanism*
*(Figs. 13 and 14)*

Instead of using the interpretation circuit of Fig. 12 and the chute 84 with a single reject door 86, to perform an accept-reject function only, I preferably use interpretation and classification mechanism which separates the inspected pieces in a plurality of classes. Either unacceptable or acceptable rollers or both may be further classified.

Figs. 13 and 14 show mechanism for such a further classification. In Fig. 13, three separation channels are respectively connected to gas-filled tetrodes 201, 202, and 203, through coupling circuits each comprising a capacitor 205 and a resistor 206. The output from each coupling circuit 205—206 is connected to the grid 207 of the connected tetrode. The cathodes 208 and the screen grids 209 of the gas tetrodes are connected to a positive bias potential, and the plates 210 of the tetrodes are respectively connected to the coils of gang relays 230, 240, and 250. Such coils in turn are connected to a positive voltage source, through the normally closed timing and re-set switch 71.

Each gang relay controls four circuits and is shown with four switches, and these are connected to control the classification mechanism of Fig. 14.

In Fig. 14, the spindle 20 of Fig. 1 is shown diagrammatically, supporting a bearing roller 30 in position for ejection by the ejection lever 80 upon actuation of the ejection solenoid 82. A chute 220 is positioned to receive the ejected roller 30, and such chute is provided with seven classification doors 221, each biased to closed position and adapted to be opened by a separate solenoid 222. Branch chutes lead from the seven classification doors respectively to seven containers 224, labeled A to G inclusive to receive the rollers diverted thereto by the selective opening of the doors 221. An eighth container H receives rollers which pass over all of the doors 221. Appropriate operation of the doors will divide the inspected rollers into eight groups or classes A to H, with each class contained in its own container.

The solenoids are all connected to one wire 218 of a suitable supply circuit, and the switches of the gang relays 230, 240, and 250 are arranged to selectively connect the solenoids to the other wire 219 of the supply circuit.

The switches of the gang relays control the solenoids 222 to operate the doors 221 to the class containers in an arrangement indicated by the letters A to H inclusive on Figs. 13 and 14. The first switch relay is connected to the solenoid 222 controlling one of the three lowermost classification doors. Thus, switch 231 of relay 230, is connected to control the door to the class E container, as indicated by the label E on its output lead; switch 241 of relay 240 is connected to control the door to the class F container, and its output lead is labeled F; and switch 251 of relay 250 is connected to control the door to the class G container, and its output lead is labeled G. The other switches of the gang relays 230 are connected in series groups to control other classification doors in the relationship indicated by the letter labels on the output leads in Fig. 13. Switches 232 and 242 in series control the door to the class B container; switches 233, 243, and 253 control the door to the class A container; switches 234 and 254 control the door to the class C container; and switches 244 and 252 control the door to the class D container.

*Operation (Figs. 13 and 14)*

The inspection operation is carried out as before, a voltage waveform representative of surface variations is generated and amplified, and the amplified signal is fed to a plurality of separation channels. It is assumed, as before, that three channels are used, that channel I is set at a low clipping level, say 25 volts, to produce a separate waveform containing pulses corresponding to small variations of the inspection surface (or other inspection characteristic), and that the counter of this channel I is set to transmit one output pulse when a relatively large number, say 2000, of input pulses are transmitted to it in that waveform of channel I. It is assumed that channel II is set to an intermediate clipping level, say 50 volts, and that its counter is set to transmit one output pulse for an intermediate count, say 500, of input pulses in the channel II waveform. It is assumed that channel III is set at a relatively high clipping level, say 75 volts, and that its counter is set to transmit an output pulse when a relatively low count of input pulses, say 10, is received by it in the waveform of its channel III.

When the preset counter in any channel is exceeded, the resulting output pulse of the counter of that channel raises the potential of the grid 207 of its gas tetrode above the bias voltage of the cathode of that tetrode, and that cathode then becomes and remains conducting. This results in a continuing current in the plate circuit of the gas tetrode and through its connected relay coil, to actuate the gange relay controlled by that coil.

The three channels control the three relays independently of each other, and any one channel will actuate its connected relay without affecting the relay connected to any other channel. Thus, if the inspection operation produces a number of pulses in the waveform of channel III in excess of the predetermined count for which the counter of that channel is set, channel III will actuate its relay 250 to close the switches 251 to 254 of that relay. If this is the only channel which actuates its connected relay, the only classification door which will be open will be door G, and the inspected piece will be delivered to the class G container. The other channels operate analogously, and control the relay switches to send the inspected piece to its proper class container according to its inspection characteristics.

At the end of each inspection cycle, the timing cams 70 and 72 (Fig. 1) will actuate the switches 69 and 71 (Figs. 1, 7, and 13). Switch 69 will reset the counters, and switch 71 will break the circuits in the tetrodes 201, 202, and 203, to open all of the relay switches and close all the classification doors 221, which will clear the mechanism for the next inspection cycle.

The classification effected will of course depend on the settings and calibration which the operator makes in accordance with established standards and the requirements of the inspection operation. The operation of the mechanism and a possible type of classification is exemplified in the following table.

TABLE 1

| Surface Condition | Channels Actuated | | | Effective Switches | Classification |
|---|---|---|---|---|---|
| | I | II | III | | |
| Light roughness, e.g., chatter marks | I | | | 231 | E |
| Light wheel marks | | II | | 241 | F |
| Body imperfections, e.g., Nicks, cracks, pits, etc. | | | III | 251 | G |
| Roughness, e.g., heavy chatter | I | II | | 232, 242 | B |
| Handling damage, e.g., dents, etc. | I | | III | 234, 254 | C |
| Wheel marks | | II | III | 244, 252 | D |
| Heavy roughness, e.g., bad grinding wheel, combined defects, etc. | I | II | III | 233, 243, 253 | A |
| Normal surface | | | | | H |

It is an advantage of my inspection mechanism that it can not only classify inspected pieces in accordance with surface imperfection but can also make a quality classification of normal pieces. This can be done, for example, by setting a channel to be responsive to normal variations of an inspected piece, and connecting that channel to actuate a stepping relay which controls classification in accordance with the number of times a certain number of pulses is registered in that channel. It may also be done by using additional channels. This may be exemplified by assuming a different set of operating conditions for the mechanism shown in Figs. 13 and 14. In this case it is assumed faulty pieces are rejected (with or without classification) by mechanism such as that already described, and that the inspection about to be described is applied to normal pieces which vary in their quality. It is assumed that three channels are used, and that all are set at a low clipping level to pass pulses representative of normal variations. The counters of the three channels are set to make predetermined counts of progressively decreasing size. For example, say channel I is set to count 3000 pulses; channel II, 2000 pulses; and channel III, 1000 pulses. The interpretation mechanism (Fig. 13) can be as before, save that only switches 231, 241, and 251 are connected. First quality rollers, producing a waveform containing less than 1000 pulses, will actuate none of the channels, and will pass over all of the classification doors, to fall into container H. Second quality rollers, producing a waveform containing between 1000 and 2000 pulses, will actuate channel III to open the classification door to container G. Third quality rollers, producing a waveform containing between 2000 and 3000 pulses, will actuate channels III and II to open classification doors to containers F and G, and the rollers will fall in container F. Fourth quality rollers, producing a waveform containing more than 3000 pulses, will actuate all channels to open all three connected doors, and will fall through the first-open door to container E.

I claim as my invention:

1. Mechanism for inspecting characteristics of a workpiece, comprising a scanning head having means to observe inherent characteristics of the workpiece in a scanning spot portion of an inspection field of the workpiece and sense random variations of such characteristics along a scanning path of the spot on the inspection field, means for relatively moving the workpiece and head to cause said spot to traverse a scanning path over the inspection field of the workpiece, electrical means responsive to said sensing along said scanning path to generate a voltage waveform containing correspondingly-random voltage variations varying in number and level with the random characteristic-variations along said path, a clipping circuit connected to said electrical means to receive said waveform and operatively biased to pass a plurality of voltage variations therein above a voltage level corresponding to a selected level of random variations of the workpiece characteristics and to prevent passage of lower-level voltage variations, and means to count the voltage excursions from said voltage level which are passed by the said clipping circuit, and thereby obtain a significant index of the random characteristic-variations of the workpiece at the said corresponding level.

2. Mechanism for inspecting characteristics of a workpiece, comprising a scanning head having means to observe inherent characteristics of the workpiece in a scanning spot portion of an inspection field of the workpiece and sense random variations of such characteristics along a scanning path of the spot on the inspection field, means for relatively moving the workpiece and head to cause said spot to traverse a scanning path over the inspection field of the workpiece, electrical means responsive to said sensing along said scanning path to generate a voltage waveform containing correspondingly-random voltage variations varying in number and level with the random characteristic variations along said path, a plurality of parallel interpretation channels having operative circuits connected to said electrical means to receive said waveform, each including in order a clipping circuit operatively biased to pass voltage variations in said waveform above a voltage level corresponding to a selected level of random variations of the workpiece characteristics and to prevent passage of lower-level voltage variations, and a counter to count the voltage excursions from said voltage level which are passed by the said clipping circuit of its channel, the said clipping circuits of said interpretation channels being biased at respectively different voltage levels.

3. Inspection mechanism, comprising a work support, a scanning head having means to observe a field characteristic in a scanning spot on an inspection field carried by said support, means to relatively move said head and support to advance said spot through a series of scanning passes along generally parallel and laterally successive lines on the field while maintaining said observation means in a substantially constant relationship to the advancing spot, electrical means responsive to said observation means to generate a voltage waveform containing variations varying in number and level with observed variations of the field characteristic along said series of passes, whereby an extended field defect will produce in said waveform a series of voltage variations corresponding to observations on successive scanning passes, a clipping circuit connected to receive said waveform and operative to remove from said waveform voltage variations below a selected voltage level, a counter connected to the clipping circuit and actuated in response to voltage excursions above such level to count voltage excursions from such selected level, and classification mechanism actuated in accordance with a predetermined plural count in said counter.

4. Inspection mechanism comprising scanning apparatus including an optical system having means to illuminate a scanning spot on an inspection field and a photosensitive device to observe light-responsive characteristic of the field in said spot, said apparatus including movable means to effect relative movement between the field and the spot in which in relation to the field said spot advances in a series of scanning passes along generally parallel and laterally successive lines on the field while said photo-sensitive device is maintained in a substantially constant relationship to the advancing spot, a photoelectric circuit controlled by said device to generate a voltage waveform which varies with the light-responsive characteristics of the field along the path of the spot, a plurality of parallel interpretation channels connected to receive the voltage waveform, each including in order a clipping mechanism which removes from the waveform voltage variations below a selected voltage level, a counting circuit connected to said clipping mechanism and in which the occurrence of a predetermined plural number of waveform excursions above the selected level produces an output signal, and a normally non-conducting thermionic valve which is rendered conductive by the occurrence of said output signal, and classification circuits controlled by said thermionic valves.

5. Mechanism for inspecting characteristics of a workpiece, comprising a scanning head having means to observe inherent characteristics of the workpiece in a scanning spot portion of an inspection field of the workpiece and sense random variations of such characteristics along a scanning path of the spot on the inspection field, means for relatively moving the workpiece and head to cause said spot to traverse a scanning path over the inspection field of the workpiece, electrical means responsive to said sensing along said scanning path to generate a voltage waveform containing correspondingly-random voltage variations varying in number and level with the random characteristic-variations along said path, a clipping circuit connected to receive said waveform and operatively biased to pass voltage variations therein above a voltage level corresponding to a selected level of random variations of the workpiece characteristics and to prevent passage of lower-level voltage variations, means to count the voltage excursions from said voltage level which are passed by the said clipping circuit, control means responsive to the occurrence of a predetermined plural count in said counting means, and mechanism controlled by said control means to designate the inspected piece as in one class when said predetermined count occurs and as in another class when said predetermined count does not occur.

6. Mechanism for inspecting characteristics of a workpiece, comprising a scanning head having means to observe inherent characteristics of the workpiece in a scanning spot portion of an inspection field of the workpiece and sense random variations of such characteristics along a scanning path of the spot on the inspection field, means for relatively moving the workpiece and head to cause said spot to traverse a scanning path over the inspection field of the workpiece, electrical means responsive to said sensing along said scanning path to generate a voltage waveform containing correspondingly-random voltage variations varying in number and level with the random characteristic variations along said path, a plurality of parallel interpretation channels connected to receive said waveform, each including in order a clipping circuit operatively biased to pass voltage variations in said waveform above a voltage level corresponding to a selected level of random variations of the workpiece characteristics and to prevent passage of lower-level voltage variations, and a counter to count the voltage excursions from said voltage level which are passed by the said clipping circuit of its channel, the said clipping circuits of said interpretation channels being biased at respectively different voltage levels, said counters being constructed and arranged to produce an output signal upon the occurrence of a predetermined plural count therein, and each interpretation channel including a normally non-conducting thermionic valve controlled by its counter and rendered conductive by the occurrence of said output signal, and workpiece class-designating circuits controlled by said valves.

7. Mechanism for inspecting characteristics of a workpiece, comprising a scanning head having means to observe inherent characteristics of the workpiece in a scanning spot portion of an inspection field of the workpiece and sense random variations of such characteristics along a scanning path of the spot on the inspection field, means for relatively moving the workpiece and head to cause said spot to traverse a scanning path over the inspection field of the workpiece, electrical means responsive to said sensing along said scanning path to generate a voltage waveform containing correspondingly-random voltage variations varying in number and level with the random characteristic variations along said path, a plurality of parallel interpretation channels connected to receive said waveform, each including in order a clipping circuit operatively biased to pass voltage variations in said waveform above a voltage level corresponding to a selected level of random variations of the workpiece characteristics and to prevent passage of lower-level voltage variations, a counter to count the voltage excursions from said voltage level which are passed by the said clipping circuit of its channel, the said clipping circuits of said interpretation channels being biased at respectively different voltage levels, said counters being constructed and arranged to produce an output signal upon the occurrence of a predetermined plural count therein, and each interpretation channel including a normally non-conducting thermionic valve controlled by its counter and rendered conductive by the occurrence of said output signal, workpiece class-designating circuits controlled by said valve, an electrically actuated reject gate, and electrical means connecting said gate for operation in response to energization of any one of said class-designating circuits whereby said gate is operated in response to the occurrence in any channel of more than the predetermined count for said channel.

8. Mechanism for inspecting characteristics of a workpiece, comprising a scanning head having means to observe inherent characteristics of the workpiece in a scanning spot portion of an inspection field of the workpiece and sense random variations of such characteristics along a scanning path of the spot on the inspection field, means for relatively moving the workpiece and head to cause said spot to traverse a scanning path over the inspection field of the workpiece, electrical means responsive to said sensing along said scanning path to generate a voltage waveform containing correspondingly-random voltage variations varying in number and level with the random characteristic variations along said path, a plurality of parallel interpretation channels connected to receive said waveform, each including in order a clipping circuit operatively biased to pass voltage variations in said waveform above a voltage level corresponding to a selected level of random variations of the workpiece characteristics and to prevent passage of lower-level voltage variations, a counter to count the voltage excursions from said voltage level which are passed by the said clipping circuit of its channel, the said clipping circuits of said interpretation channels being biased at respectively different voltage levels, said counters being constructed and arranged to produce an output signal upon the occurrence of a predetermined plural count therein, and each interpretation channel including a normally non-conducting thermionic valve controlled by its counter and rendered conductive by the occurrence of said output signal, workpiece class-designating circuits controlled by said valves, said class-designating circuits comprising relay coils respectively controlled by the thermionic valves of said channels, relay contacts controlled by said coils, and classification gate means selectively actuated in response to related energization of said relay coils and the actuation of the contacts controlled thereby.

9. Apparatus for inspecting a surface of a workpiece, said surface being one of generation about an axis, comprising observation means to observe light reflected from a scanning spot portion of said surface, means to relatively rotate said observation means and workpiece about said axis and to relatively move the same in a direction generally parallel to an element of the surface of generation while maintaining said observation means in a substantially constant observation relation with the scanning spot portion of the surface and thereby to cause said spot to scan said surface along a spiral scanning path, means to illuminate the said spot during such scanning, means including said observation means and responsive to reflected light observed by said observation means to generate a voltage waveform containing voltage variations varying in number and level with the observed variations in reflectance of the surface along the scanning path, electrical means connected to receive said waveform and operative to accumulate voltage excursions from a selected voltage level in said waveform, and means connected to said electrical means and operative to indicate the inspection result in accordance with the excursion accumulation in said electrical means.

10. Apparatus according to claim 9 in which a plurality of parallel electrical means are connected to receive said waveform and are respectively operative to accumulate voltage excursions from different voltage levels, and means is connected to each said parallel electrical means and operative in response to the excursion accumulation therein to indicate the inspection result at the level of operation of such electrical means, whereby indications are obtained of inspection results at a plurality of different levels.

11. Mechanism for inspecting characteristics of a workpiece, comprising a scanning head having means to observe inherent characteristics of the workpiece in a scanning spot portion of an inspection field of the workpiece and sense random variations of such characteristics along a scanning path of the spot on the inspection field, means for relatively moving the workpiece and head to cause said spot to traverse a scanning path over the inspection field of the workpiece, electrical means responsive to said sensing along a predetermined length of said scanning path to generate a voltage waveform of corresponding extent containing correspondingly-random voltage variations varying in number and level with the random characteristic-variations along said path, second electrical means connected to receive said waveform and operative to accumulate over the length thereof voltage variations therein from a selected voltage level, and means responsive to a predetermined total accumulation by said second electrical means and operable to designate the inspected workpiece as in one class when said predetermined total accumulation occurs and as in another class when said predetermined total does not occur.

12. Apparatus for inspecting a surface of a workpiece, comprising a scanning head having sensing means for sensing surface characteristics in a scanning spot portion of the surface and operative to sense random variations of such characteristics along a scanning path of the spot on the surface, means for relatively moving the workpiece and said head to cause said spot to traverse a scanning path over the workpiece surface in a series of successive passes along generally parallel closely spaced lines and in a substantially constant sensing aspect, electrical means responsive to said sensing to generate a voltage waveform containing voltage variations varying in number and level with surface variations along the scanning path, whereby an extended defect will be represented by a series of voltage variations produced on successive scanning passes, second electrical means connected to receive said voltage waveform and operative to accumulate voltage variations therein from a selected voltage level, and means responsive to a predetermined total accumulation by said second electrical means and operable to designate the inspected workpiece as in or not in a particular class in accordance with whether said predetermined total accumulation does or does not occur.

13. Mechanism for inspecting surfaces of bearings, comprising means to support a bearing element for inspection of its surface, a scanning head having sensing means for sensing surface characteristics in a scanning spot portion of the surface and operative to sense variations of such characteristics along a scanning path of the spot on the surface, said means being operative to sense minor variations which if present to a limited degree put the surface in a certain class and which if present to a larger degree put the surface in a different class, means for relatively moving the workpiece and head to cause said spot to traverse a scanning path over the inspection surface, electrical means responsive to said sensing along a predetermined length of said scanning path to generate a voltage waveform containing voltage variations varying in number and level with the sensed minor variations along said path, second electrical means connected to receive said waveform and operative to accumulate over the length thereof voltage variations therein from a selected voltage level, and means responsive to the total accumulation by said second electrical means to indicate whether the inspected surface is in said certain class or in said different class.

14. Apparatus for inspecting surfaces of bearings, comprising means to support a bearing element for inspection, scanning means having means to sense surface characteristics in a scanning spot portion of the surface and operative to sense both the number and magnitude of variations of such characteristics along a scanning path of the spot on the bearing surface, means for relatively moving the bearing element and scanning means to cause said spot to traverse a scanning path over the surface of the bearing element, electrical means responsive to said sensing along a predetermined length of said scanning path to generate a voltage waveform containing voltage variations corresponding in number and magnitude to the sensed surface variations, second electrical means connected to receive said waveform and operative to accumulate voltage variations therein at a plurality of levels corresponding to different levels of surface variations, and means responsive to such accumulations by said second electrical means to indicate the classification of the inspected surface in accordance with the accumulated voltage variations at the different levels, and thereby to indicate classification with respect both to the number and the magnitude of sensed surface variations.

References Cited in the file of this patent

UNITED STATES PATENTS

| | | |
|---|---|---|
| 2,051,695 | Glacy | Aug. 18, 1936 |
| 2,095,124 | Cockrill | Oct. 5, 1937 |
| 2,132,447 | Stout | Oct. 11, 1938 |
| 2,189,110 | Honaman et al. | Feb. 6, 1940 |
| 2,312,357 | Odquist | Mar. 2, 1943 |
| 2,318,856 | Hoffman | May 11, 1943 |
| 2,408,078 | Labin | Sept. 24, 1946 |
| 2,418,521 | Morton | Apr. 8, 1947 |
| 2,494,441 | Hillier | Jan. 10, 1950 |
| 2,529,666 | Sands | Nov. 14, 1950 |
| 2,612,994 | Woodland | Oct. 7, 1952 |
| 2,627,347 | Powers | Feb. 3, 1953 |
| 2,636,983 | Poole | Apr. 28, 1953 |
| 2,639,209 | Gamarekian | May 19, 1953 |
| 2,648,012 | Scherbotskoy | Aug. 4, 1953 |
| 2,661,902 | Wolff | Dec. 8, 1953 |
| 2,701,055 | Strom | Feb. 1, 1955 |
| 2,707,555 | Gaudin | May 3, 1955 |

FOREIGN PATENTS

| | | |
|---|---|---|
| 679,959 | Great Britain | Sept. 24, 1952 |